3,117,870
MANUFACTURE OF COTTAGE CHEESE
Ralph V. Hussong and Elmer H. Marth, Deerfield, and Demetrius G. Vakaleris, Chicago, Ill., assignors to National Dairy Products Corporation, New York, N.Y., a corporation of Delaware
No Drawing. Filed June 6, 1962, Ser. No. 200,327
5 Claims. (Cl. 99—116)

The present invention relates to the manufacture of cottage cheese and, more particularly, it relates to an improved process for the manufacture of cottage cheese to provide cheese which has extended shelf life and minimum flavor deterioration over extended periods.

Cottage cheese is commercially produced from pasteurized skim milk, a general make procedure being the following:

Step 1.—Pasteurized skim milk is inoculated with a suitable starter, such as lactic acid starter, and rennet is added to the milk.

Step 2.—During setting, acid is developed in the milk because of the presence of the lactic acid starter. The setting will normally take more than four hours, and will be carried out at a temperature of from 85° F. to 92° F. to facilitate desired acid development. (Longer setting periods have been employed when smaller amounts of starter are used, for example, 12 to 16 hours at a temperature of 70° F. to 80° F.)

Step 3.—When a firm curd is formed, the curd is cut into small cubes. The time for cutting the curd is determined by the acidity of the whey. Conventionally, the cutting acidity is approximately 0.50 percent or greater at the time the curd is cut.

Step 4.—The curd is then cooked, with stirring. The cooking operation is carried out by slowly heating the curd and whey from the normal setting temperature of from 85° F. to 92° F. to between about 120° F. to 130° F. Cooking is normally accomplished in about 1½ to 2 hours.

Step 5.—After cooking, the whey is drained from the curd, and the curd is immediately subjected to several washings with chilled water.

Step 6.—After washing, the curd is again drained, whereupon it is salted.

The cottage cheese curd is now in substantially finished form. It is customary to add cream to the curd, whereupon it is packaged for storage and shipping.

Governmental standards in the United States specify that the moisture content of cottage cheese, before creaming, shall be less than 80 percent, by weight. A typical composition range for uncreamed cottage cheese is: between about 71.4 percent and about 79.9 percent moisture; between about 12.7 percent and about 21.1 percent protein; about 0.5 percent fat; and between about 0.2 percent and about 1.1 percent salt-free ash.

It will be seen that, while pasteurized skim milk is utilized in the conventional method for the preparation of cottage cheese, the milk thereafter is inoculated with lactic-acid producing organisms, and it will also be seen that temperature conditions during the make procedure are such that the growth of these and other organisms is enhanced rather than inhibited. As a result, the cottage cheese does not have extended shelf life and, in fact, has a relatively short shelf life. This occurs despite strict adherence to recognized sanitary procedures.

In this connection, typical storage life for cottage cheese even when held under refrigerator conditions is of the order of one to two weeks. Consequently, this desirable and commercially-available cheese product is normally marketed in the immediate area of its production, in order to make the cottage cheese available to the consumer as soon as possible after production. In addition, rigidly scheduled pickup and return of cottage cheese from retail outlets is practiced to assure that the consumer obtains a high-quality product at all times.

Various attempts have been made to improve the storage life of cottage cheese as by pasteurization of the curd after the conventional make procedure. However, these attempts have not been generally successful, and subjecting conventional cottage cheese curd to pasteurization temperatures has heretofore rendered the cheese tough and unpalatable.

Accordingly, it is an object of the present invention to provide an improved process for the manufacture of cottage cheese. A more particular object of the present invention is to provide an improved process for the manufacture of cottage cheese which results in cheese having extended shelf life. Other objects and advantages of the present invention will be apparent from the following description and claims.

In accordance with the present invention, skim milk which is to be used in the manufacture of the cottage cheese is treated under special conditions of temperature and time to effect a desired conditioning of the milk. The milk thus treated is then inoculated with the usual starter organisms and rennet is added. A relatively low cutting acid is developed and an acidity between about 0.40 percent and about 0.44 percent, expressed as lactic acid, is developed. It will be noted that this cutting acidity is considerably less than the usual cutting acid for conventional cottage cheese make procedures, and the pH of the curd is substantially higher than that usually provided by such make procedures. Thereafter, the curd is subjected to heat treatment at a temperature of about 130° F. for at least 45 minutes and up to a temperature of about 145° F. for equivalently diminished periods of time at the higher temperatures. Equivalent time periods at such higher temperatures are known and available to those skilled in the art. Thus, the curd is subjected to conditions of temperature and time which effect destruction of most micro-organisms.

More particularly, in accordance with the present invention, the milk is subjected to high-temperature treatment which, for purposes of this specification, will be referred to as "ultra-high" heat treatment. The ultra-high heat treatment is such that more than about 40 percent of the serum protein is denatured. To obtain best results, more than about 60 percent of the serum protein is denatured. Such 60 percent denaturation can be accomplished by holding the milk at 200° F. for 40 seconds; 260° F. for 12 seconds; or at 300° F. for zero time. The treatment conditions for effecting the desired denaturation are familiar to those skilled in the art and can be practiced in various pieces of commercially available equipment.

If more than about 80 percent of the serum protein is denatured, browning of the milk usually occurs, and the milk may acquire an undesired cooked flavor. Accordingly, the ultra-high heat treatment, in accordance with this invention, should provide between about 40 percent and about 80 percent denaturation of the serum protein. This ultra-high heat treatment is to be distinguished from usual pasteurization treatment, which does not provide the benefits of the present invention.

The heat-treated milk is then converted into cottage cheese by setting of the milk and cutting of the resultant curd when the acid has developed into the previously indicated range, which, as indicated, is substantially lower than the conventional cutting acidity. In this connection, harmless acid-producing bacteria and rennet are added to the heat-treated milk to cause desired acid development and setting. The acid-producing bacteria are normally added as a lactic acid starter. The amount of starter and the amount of rennet which are added is in accordance with the skill of the art. As is known, the amount of starter added and the rate of growth of the organisms determines, to a considerable extent, the period of setting.

As before indicated, acid development is allowed to proceed to an acidity of between about 0.40 percent and about 0.44 percent. This particular acidity is chosen to render the curd amenable to subsequent heat treatment.

In this connection, if the cutting acidity exceeds the described range, the whey-expelling characteristics of the resultant curd are such that, despite the subsequent relatively high-temperature heat treatment thereof, excessive amounts of whey are retained in the curd. Consequently, the final product is wet and pasty, and contains excessive amounts of moisture.

Also in this connection, if the cutting acidity is below the indicated range, the whey-expelling characteristics of the resultant curd are such that too much moisture is expelled in the subsequent high-temperature heat treatment, and a tough and rubbery curd results.

The cutting operation is carried out in the usual manner so that the curd is not broken into fine particles but remains in cube form. After cutting, the curd is cooked, and, in accordance with the present invention, is cooked to a higher temperature than is used in conventional make precedures. In this connection, the curd is cooked to a temperature between about 130° F. and about 145° F. The cooking step is normally carried out over a time period of about 1½ hours. If the curd is cooked to temperatures higher than about 130° F., the time during which it is subjected to such higher temperatures must be taken into consideration in connection with the heat treatment of the present invention.

The heat treatment may be carried out before the whey is drained from the curd, or it may be carried out after the whey is drained by washing the curd with water at a temperature in the indicated range, or by a combination of the two methods.

For example, as pointed out hereinbefore, the curd may be subjected to a temperature in the indicated range during the cooking step. Thereafter, the whey may be drained from the curd, and the curd may be washed one or more times with hot water to provide an additional period of time during which the curd is subjected to temperatures in the indicated range. The cumulative time of exposure, during cooking, during the hot wash, and during any subsequent heat treatment, to temperatures in the indicated range is the proper time criterion in accordance with the present invention.

Following heat treatment, the curd may be given additional water washings, may be salted, and is then in substantially finished form. The resultant cottage cheese may be creamed and packaged for distribution.

As a consequence of the heat treatment of the curd, the number of bacteria in the curd is substantially reduced, so that extended shelf life in excess of eight weeks may be provided. Of course, care should be taken that the cottage cheese is not re-contaminated following the heat treatment. In this connection, following the heat treatment, recognized sanitary practices should be observed to insure that the curd is not re-contaminated. Desirably, the curd is maintained at temperatures above about 130° F. throughout processing subsequent to heat treatment and until the cheese is packaged and sealed. Alternatively, it is possible to maintain aseptic conditions throughout this processing.

All of the wash water should be pasteurized, and, if the cheese is to be creamed, the cream should be pasteurized. Preferably, the cream which is added is at elevated temperature, i.e., above about 140° F. By adding hot cream, the curd may be better maintained at temperatures which inhibit microbial survival and growth until the cheese is packaged and the packages are sealed. The containers in which the cheese is packaged should be virtually free from microbial contamination.

Despite the temperature conditions to which the curd is exposed during the heat treatment, the product of the present invention has desirable organoleptic properties. In this connection, as pointed out hereinbefore, if conventional cottage cheese curd is subjected to temperatures in the range of the present invention, there is obtained a cheese which is tough and unpalatable. This is to be contrasted with the product of the present invention, which is typical of any high-quality cottage cheese heretofore produced by conventional techniques. In addition, the product of the present invention includes substantially more serum protein than does conventional cottage cheese, which is recognized as a desirable nutritive addition.

The number of bacteria in the curd may be controlled by adjusting the time period of heat treatment. However, the heat treatment is preferably limited to not more than about 2½ hours in the indicated temperature range. If the heat treatment is continued for periods substantially greater than 2½ hours, the product acquires a toughness which is not desirable.

EXAMPLE I 475 pounds of raw skim milk was subjected to ultra-high heat treatment to denature the serum protein. The ultra-high heat treatment was effected in a tubular heat exchanger comprising 25 feet of one inch diameter stainless steel pipe, the outer surface of which was steam-heated so that the milk was heated to 220° F. The residence time of the skim milk in the heat exchanger was 30 seconds, following which the milk was immediately cooled to ambient temperatures. Analysis of the serum protein nitrogen content by the Harland and Ashworth method indicated that 70 percent of the serum protein was denatured by the foregoing heat treatment.

The milk was introduced into a conventional cottage cheese vat, and its temperature was adjusted to 90° F. 25 pounds of lactic acid starter was added to the milk. When the acidity had reached 0.28 percent, about 0.5 ml. of rennet extract was added to the milk.

About four hours after addition of the starter, the acidity had reached 0.44 percent. At this acid level, the curd was cut, and the curd was then cooked up to a temperature of 140° F. within a period of about 1½ hours. The curd was at temperatures greater than 130° F. for the last 15 minutes of the cooking period.

After completion of the cooking step, the curd was allowed to remain in the whey at a temperature of 140° F. for an additional 15 minutes, whereupon a first portion of the curd was removed from the whey and was given three washes with 140° F. water, to provide a first portion of cottage cheese. Each wash required five minutes, for a total washing time of 15 minutes. All of the wash water had previously been pasteurized by holding it at 150° F. for 30 minutes.

A second portion of the curd was allowed to remain in the whey at 140° F. for an additional 60 minutes after removal of the first portion. The second portion of the curd was also given three washes with 140° F. pasteurized water in the same manner as the first portion.

A third portion of the curd was allowed to remain in the whey at 140° F. for an additional 45 minutes after removal of the second portion of the curd, and the third portion was also washed with 140° F. water in the same manner as the first portion, to provide a third portion of cottage cheese.

A creaming mixture was prepared by blending cream and skim milk to provide a mixture comprising 12 percent fat. Salt was added to the mixture at a level of 3 percent, and the salted mixture was then pasteurized by holding at 180° F. for 30 minutes. The creaming mixture was then homogenized at a pressure of 3500 p.s.i., and was refrigerated until ready for use at which time it was again pasteurized immediately before use.

Each of the first, second, and third portions of cottage cheese was creamed immediately after washing by adding to the cheese a quantity of the foregoing pasteurized creaming mixture in a proportion of one part of the creaming mixture to two parts of cheese. The creaming mixture was at a temperature of 160° F. at the time of addition to the cheese, so that the temperature of the creamed cottage cheese was 138–140° F.

Immediately after creaming, each of the first, second, and third portions of cottage cheese was packaged in sterilized containers. The containers were sealed and cooled by submerging them in ice-water, and were thereafter stored at refrigerator temperatures.

Samples of each of the first, second, and third portions of cottage cheese were evaluated for organoleptic properties one day after making. Table 1 summarizes the results of this evaluation in relation to the time period during which the curd comprising each cottage cheese sample was held at temperatures above 130° F. The first and second portions of cheese had good body, texture, and flavor one day after preparation. The third portion of cheese was more firm than desirable, indicating that the curd from which the cheese was prepared had been subjected to heat treatment for an excessive period of time.

washed with 130° F. water which had previously been pasteurized. The curd was stirred gently in the first wash water for 15 minutes, whereupon the first wash was drained from the curd. The temperature of the curd at this time was 132° F.

The curd was subjected to a second wash with 130° F. water. The curd was allowed to remain in the second wash for 15 minutes, whereupon the wash water was drained from the curd. The temperature of the curd at this time was 130° F.

A first portion of the resultant cottage cheese was thereupon removed from the vat and creamed by the addition of the creaming mixture set forth in Example I, which was at a temperature of 160° F. After creaming, the temperature of the first portion of the cottage cheese was 140° F.

The remaining curd in the vat was subjected to a third washing with 130° F. water for 15 minutes, whereupon the wash water was drained from the curd and the resultant cottage cheese, hereinafter called the second portion, was creamed in the same manner as the first portion. After creaming, the temperature of the second portion was 140° F.

The first and second portions of cottage cheese were

*Table 1.—Effect of Treatment Time on Body and Texture*

| Cottage Cheese Sample | Time (minutes) During Which Curd was Held At or Above 130° F. | | | | | Organoleptic Properties | | |
|---|---|---|---|---|---|---|---|---|
| | During Cook | In Whey After Cook | During Wash | During Creaming and Packaging | Total | Body | Texture | Flavor |
| First | 15 | 15 | 15 | 10 | 55 | Good | Good | Good. |
| Second | 15 | 75 | 15 | 10 | 115 | Good | Good | Good. |
| Third | 15 | 120 | 15 | 10 | 160 | Too Firm | Acceptable | Good. |

EXAMPLE II 460 pounds of skim milk was subjected to ultra-high heat treatment to denature the serum protein in the same manner set forth in Example I, whereby 70 percent of the serum protein was denatured.

The milk was introduced into a conventional cottage cheese vat, and its temperature was adjusted to 90° F. 25 pounds of lactic acid starter was added, whereupon acid development commenced. Calcium chloride was added to the milk at a level of 0.02 percent.

About 1½ hours after addition of the starter, the acidity of the milk reached 0.24 percent, whereupon about 0.5 ml. of rennet extract was added.

About 4 hours and 15 minutes after addition of the starter, the acidity reached 0.43 percent, whereupon the curd was cut in a conventional manner. The curd was then cooked up to a temperature of 140° F. over a period of 1½ hours, during the last 15 minutes of which the curd was exposed to temperatures above 130° F.

The whey was drained from the curd, and the curd was packaged in sterile containers immediately after creaming, and the packaged cheese was thereafter cooled by submerging the packages in an ice bath.

The first portion of the creamed cottage cheese comprised 21.3 percent total solids, and the second portion comprised 21.5 percent total solids. Both the first and second portions had body, texture, and flavor equal to that of any high-quality cottage cheese.

Samples of the first and second portions of creamed cottage cheese were thereafter stored at 45° F. for 60 days. Samples of each portion were periodically removed and evaluated for organoleptic properties, and for numbers of microorganisms. The body, texture, and flavor of both portions remained good throughout the storage period. Table 2 summarizes the bacteriological status of the cottage cheese of the present invention during the storage period, in comparison with a conventional cottage cheese product. The conventional cottage cheese product was completely unsalable at the end of two weeks due to spoilage, while the cottage cheese portions of the present invention were still good after eight weeks of refrigerated storage.

*Table 2.—Effect of Heat Treatment on Storage Life*

| Cottage Cheese Sample | Time (minutes) During Which Curd was Held At or Above 130° F. | | | | Numbers of Bacteria Per Gram After Storage at 45° F. | | | | | | | | |
|---|---|---|---|---|---|---|---|---|---|---|---|---|---|
| | During Cook | After Cook and During Wash | During Packaging and Creaming | Total | 1 Day | 1 Week | 2 Weeks | 3 Weeks | 4 Weeks | 5 Weeks | 6 Weeks | 7 Weeks | 8 Weeks |
| First | 15 | 55 | 10 | 80 | 350 | | | 20 | 500 | | | | 340 |
| Second | 15 | 70 | 10 | 95 | 360 | | | 360 | 370 | 360 | 340 | 250 | 280 |
| Conventional Cottage Cheese | | | | | 6,000 | 1.8 million | 36 million | | | | | | |

Thus there has been provided an improved process for the manufacture of cottage cheese which results in cheese which has extended shelf life. The process is easily adaptable to conventional cottage cheese processing apparatus and methods, and provides a product which has body, texture, and flavor equal to that of high-quality cottage cheese heretofore known.

Various features of the present invention are set forth in the following claims.

What we claimed is:

1. An improved process for the manufacture of cottage cheese having increased shelf life, comprising the steps of subjecting the milk to high temperature treatment to effect at least about 40 percent denaturation of its serum protein, setting the milk to form cottage cheese curd and whey, cutting the curd at an acidity between about 0.40 percent and about 0.44 percent, and thereafter subjecting the curd to heat treatment that is equivalent to a heat treatment at a temperature of about 130° F. for at least about 45 minutes, and packaging said curd in containers while maintaining said curd at a temperature of at least 130° F., whereby microbial survival and growth are inhibited and a cottage cheese curd is provided which has increased shelf life.

2. An improved process for the manufacture of cottage cheese having increased shelf life, comprising the steps of subjecting the milk to high temperature treatment to effect between about 40 percent and about 80 percent denaturation of its serum protein, setting the milk to form cottage cheese curd and whey, cutting the curd at an acidity between about 0.40 percent and about 0.44 percent, and thereafter subjecting the curd to heat treatment that is equivalent to a heat treatment at a temperature of about 130° F. for at least about 45 minutes, and packaging said curd in containers while maintaining said curd at a temperature of at least about 130° F., whereby microbial survival and growth are inhibited and a cottage cheese curd is provided which has increased shelf life.

3. An improved process for the manufacture of cottage cheese having increased shelf life, comprising the steps of subjecting the milk to high temperature treatment to effect between about 60 percent and about 80 percent denaturation of its serum protein, setting the milk to form cottage cheese curd and whey, cutting the curd at an acidity between about 0.40 percent and about 0.44 percent, thereafter subjecting the curd to heat treatment that is equivalent to a heat treatment at a temperature of about 130° F. for at least about 45 minutes, and packaging said curd in containers while maintaining said curd at a temperature of at least about 130° F., whereby microbial survival and growth are inhibited and a cottage cheese curd is provided which has increased shelf life.

4. An improved process for the manufacture of cottage cheese having increased shelf life, comprising the steps of subjecting the milk to high temperature treatment to effect between about 60 percent and about 80 percent denaturation of its serum protein, setting the milk to form cottage cheese curd and whey, cutting the curd at an acidity between about 0.40 percent and about 0.44 percent, thereafter subjecting the curd to heat treatment that is equivalent to a heat treatment at a temperature of about 130° F. for at least about 45 minutes, creaming the heat-treated curd with cream having a temperature above about 140° F., and packaging said curd at a temperature of about 130° F., whereby microbial survival and growth are inhibited and a cottage cheese curd is provided which has increased shelf life.

5. An improved process for the manufacture of cottage cheese having increased shelf life, comprising the steps of subjecting the milk to high temperature treatment to effect between about 60 percent and about 80 percent denaturation of its serum protein, setting the milk to form cottage curd and whey, cutting the curd at an acidity between about 0.40 percent and about 0.44 percent, thereafter subjecting the curd to heat treatment that is equivalent to a heat treatment at a temperaure of about 130° F. for a least about 45 minutes but less than about 2½ hours, and packaging said curd in containers while maintaining said curd at a temperature of at least about 130° F., whereby microbial survival and growth are inhibited and a cottage cheese curd is provided which has increased shelf life.

References Cited in the file of this patent

UNITED STATES PATENTS 3,039,879     Vakaleris _____ June 19, 1962